Figure 3:
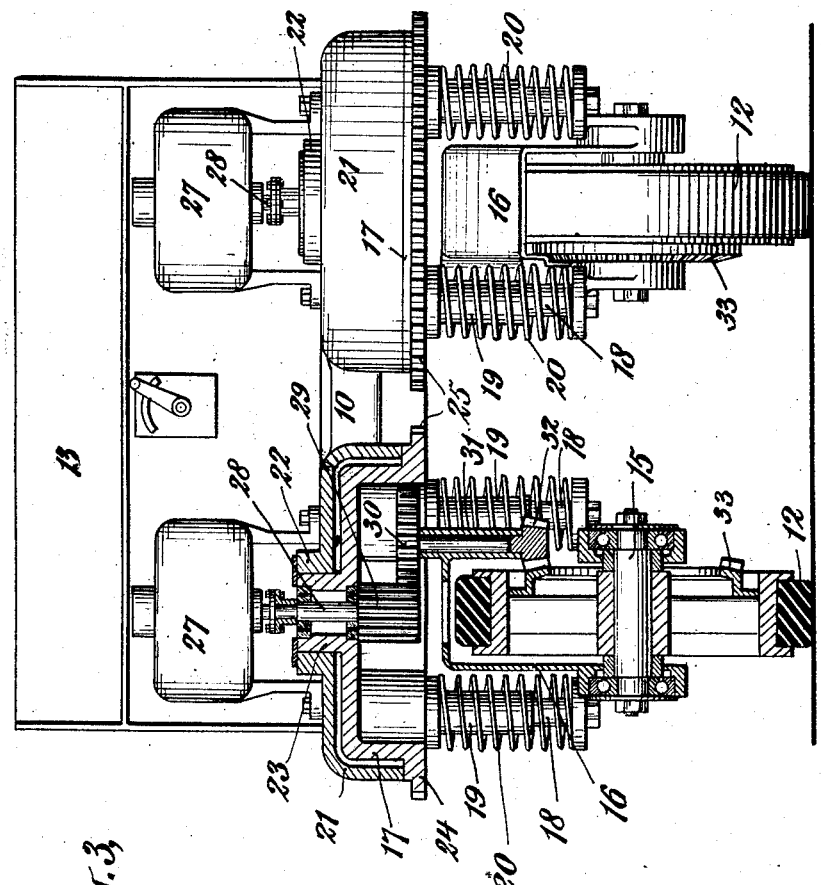

W. CHRISTIE.
MOTOR VEHICLE.
APPLICATION FILED JAN. 26, 1910.
965,083.
Patented July 19, 1910.
2 SHEETS—SHEET 1.
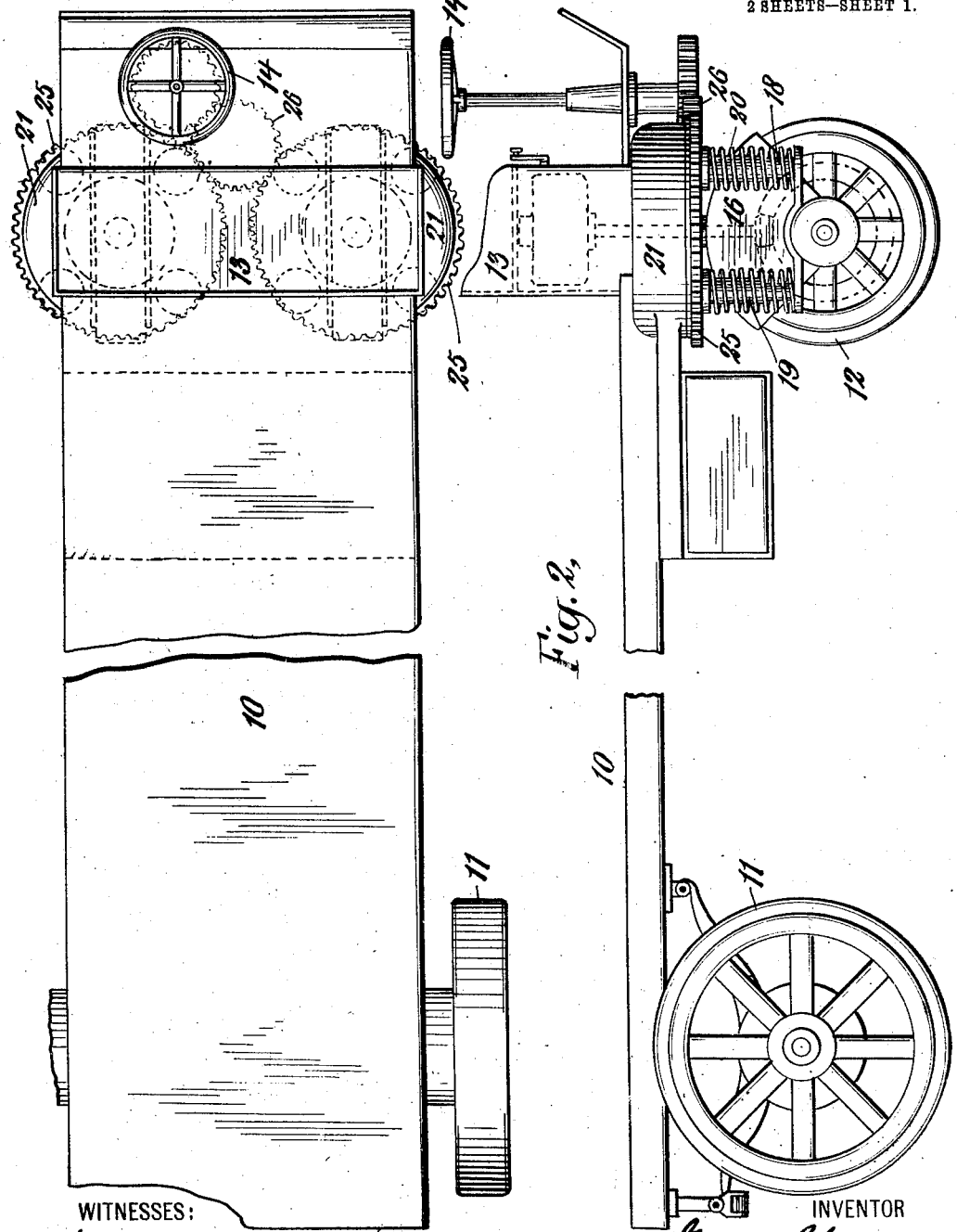

W. CHRISTIE.
MOTOR VEHICLE.
APPLICATION FILED JAN. 26, 1910.

965,083.

Patented July 19, 1910.
2 SHEETS—SHEET 2.

WITNESSES:

INVENTOR
Walter Christie
BY
his ATTORNEYS

UNITED STATES PATENT OFFICE.

WALTER CHRISTIE, OF NEW YORK, N. Y.

MOTOR-VEHICLE.

965,083.  Specification of Letters Patent. Patented July 19, 1910.

Application filed January 26, 1910. Serial No. 540,121.

*To all whom it may concern:*

Be it known that I, WALTER CHRISTIE, a citizen of the United States of America, and a resident of New York, county and State of New York, have invented certain new and useful Improvements in Motor-Vehicles, of which the following is a specification, reference being had to the accompanying drawings, forming a part thereof.

This invention relates to improvements in motor vehicles, and particularly to improvements in the driving and steering means therefor, and it consists essentially in a novel form and construction of means whereby driving and steering movements may be effected through the same wheels.

In carrying out my invention, I mount the wheels in rotatable carriers, and connect the carriers so that they rotate together, the rotational movements thereof acting to deflect the wheels for steering purposes, and I arrange for driving the wheels through mechanism including a power transmitting element mounted concentrically with respect to the said carriers, whereby the rotative movements of the carrier will not affect the driving movements of the wheels in any way. Such a construction is highly advantageous as it dispenses with the complicated universal joint connections otherwise necessary, and furthermore, it permits the wheels to be deflected to any extent whereby the vehicle may be turned in an arc having a short radius.

Further advantages of my invention are extreme simplicity of construction, low cost of manufacture, accessibility of the parts, a great reduction of the space ordinarily occupied by the mechanism, and the concentration of all the mechanism to one part of the vehicle.

My invention also consists in certain novel details of construction and combinations of parts as will hereinafter be fully pointed out, and in order that my invention may be thoroughly understood, I will now proceed to describe a motor vehicle constituting an embodiment of my invention, having reference to the accompanying drawings illustrating the same, and will then point out the novel features in claims.

In the drawings: Figure 1 is a top view of a truck provided with a driving and steering mechanism constructed in accordance with my invention. Fig. 2 is a view in side elevation of the same. Fig. 3 is a part front view and a view partly in central transverse section through one of the combined front and steering driving wheels.

The vehicle includes a supporting frame 10, rear wheels 11, and front wheels 12. In the present drawings I have shown no vehicle body upon the frame because the same constitutes no part of my invention. The vehicle body may be of any desired form, and in particular, as the present construction is well adapted to trucks, the body may conveniently be of any suitable truck body form. Near the front end of the vehicle is a driver's seat 13, and conveniently disposed with respect thereto is a steering wheel 14.

In the present construction the rear wheels are mere trailers, both driving and steering being accomplished through the medium of the front wheels 12. Each of these wheels is mounted independently upon a short axle 15 mounted to rotate in suitable bearings upon a carrier comprising a yoke 16 which straddles the wheel and a head 17. A limited vertical movement is permitted between the said head and the yoke portions of the carrier, a sliding connection being formed by pins 18 carried by the yoke and tubes 19 carried by the head, the said head being supported upon the yoke by means of supporting springs 20. The sliding connection limits the relative movement of the two parts to relative vertical movements, the two parts moving otherwise as a unit. The head portion of the carrier is mounted in a turret 21 secured to, or formed as a part of, the frame 10. The said turret is provided with a portion 22 which acts as a bearing for a hub 23 upon the head 17, and the said turret also rests upon a flange 24 with which the head is provided, the exterior of the flange having gear teeth 25 whereby the said flange and teeth constitute a gear wheel. The gear wheels 25—25 of the two carrier heads are rotatively connected together through an intermediate idler gear wheel 26, the said connection causing the rotative movements of one carrier to be partaken of by the other in the same direction and to the same extent. The wheels 12 being carried by the carriers the rotative movements of the said carriers will cause the said wheels to turn one way or the other, whereby to impart steering movements to the vehicle. The steering wheel 14 is connected through any suitable gear or sprocket connections with the said carriers whereby the steering will be effected by manipulation of the said wheel.

Each of the turrets 21 supports an electric motor 27, the shaft 28 whereof carries a driving pinion 29. The said driving pinion is arranged in mesh with a spur gear 30 mounted in suitable bearings 31 carried by the yoke 16. Secured to rotate with the sprocket 30 is a bevel gear pinion 32, the teeth of which are disposed in mesh with a bevel gear wheel 33 carried by the wheel 12. Driving movements are imparted to each wheel 12 from its motor 27 through the shaft 28 and gear 29 thereof, the spur gear 30, and the bevel gear pinion 32, to the bevel spur gear 33. The shaft 28 being concentric with the axis of rotation of the carrier the rotative movements applied thereto for steering purposes will in nowise affect the driving connection. The relative vertical movements between the carrier, yoke, and head are provided for by elongating the pinion 29 (see Fig. 3), thereby permitting the pinion 29 and spur wheel 30 to slide relatively to each other for a considerable distance while remaining properly in mesh.

From the foregoing it will be seen that I provide an exceedingly simple and inexpensive structure to constitute the driving and steering means of a motor vehicle; furthermore, the construction produces both front driving and front steering, such as is of great advantage both in the control of the vehicle and in the efficiency of driving power attained. Such a construction is, furthermore, peculiarly adapted for truck work, for the reason that it takes up but a minimum of room and leaves the body portion entirely free and clear of all mechanism. The frame and rear wheels of a standard truck may be employed, if desired, the turret portions and parts secured thereto being attached to the front portion of the frame. The batteries may be conveniently located to the rear of the front wheels as appears in Fig. 2 of the drawings, and the motors are conveniently disposed beneath the driver's seat.

The advantages of this form of steering will be immediately apparent to anyone skilled in the art. In the ordinary type of motor vehicle the steering wheels can be deflected but to a comparatively slight degree, and as the modern tendency is toward a long wheel base,—especially in trucks,—such a vehicle requires a very large radius to turn in. Very few motor vehicles today can be turned in a single operation in a city street; they require to be worked backward and forward and so gradually turned, thereby blocking the street during the operation. In the construction of my present invention the wheels can be deflected to any extent; in fact, their carriers may be completely rotated. Thus, the vehicle may be turned completely in a radius of less than twice its own length in a single operation.

I have shown the vehicle as provided with a pair of front driving and steering wheels, but of course it is obvious that one of them may be omitted and the other one placed in the center without any other change and an extremely simple and inexpensive form of three-wheel truck will result, or, if preferred, I may employ more than two wheels, as obviously any number may be placed side by side, and such construction and arrangement of parts might have some advantages for exceedingly large and heavy trucks.

What I claim is:

1. In a motor vehicle, the combination with a steering wheel, of a carrier therefor comprising two parts,—one carrying bearings for the wheel, and the other part journaled in a bearing above the wheel to rotate about an axis at right angles to the axis of rotation of the wheel,—the two parts being arranged in sliding relation with each other whereby they may move relatively in one direction but are otherwise secured together, spring means disposed between the two parts, means for imparting movements of rotation to the carrier about its axis for steering purposes, and means for imparting driving movements to the wheel.

2. In a motor vehicle, the combination with a steering wheel, of a carrier therefor comprising two parts,—one carrying bearings for the wheel, and the other part journaled in a bearing above the wheel to rotate about an axis at right angles to the axis of rotation of the wheel,—the two parts being arranged in sliding relation with each other whereby they may move relatively in one direction but are otherwise secured together, spring means disposed between the two parts, means for imparting movements of rotation to the carrier about its axis for steering purposes, and means for imparting driving movements to the wheel, including a part mounted to rotate concentrically with the axis of rotation of the carrier.

3. In a motor vehicle, the combination with a steering wheel, of a carrier therefor comprising two parts,—one carrying bearings for the wheel, and the other part journaled in a bearing above the wheel to rotate about an axis at right angles to the axis of rotation of the wheel,—the two parts being arranged in sliding relation with each other whereby they may move relatively in one direction but are otherwise secured together, spring means disposed between the two parts, means for imparting movements of rotation to the carrier about its axis for steering purposes, a power transmitting element disposed axially in a line with the axis of rotation of the carrier, and gearing between the said power transmitting element and the said wheel, for transmitting driving movements from the one to the other.

4. In a motor vehicle, the combination with a steering wheel, of a carrier therefor comprising a yoke provided with bearings for the wheel and a head disposed in sliding relation with the yoke, springs between the head and yoke, a turret for receiving the said head, and in which the same is mounted to rotate about an axis at right angles to the axis of rotation of the wheel, a power transmitting shaft arranged axially in line with the axis of rotation of the carrier, an intermediate shaft mounted parallel thereto in bearings upon the yoke portion of the carrier, gearing between the two said shafts, gearing between the said intermediate shaft and the driving wheel, and means for imparting movements of rotation to the carrier for steering purposes.

5. In a motor vehicle, the combination with a combined driving and steering wheel, of a carrier therefor comprising two parts, one in the form of a yoke which straddles the wheel and has bearings therefor upon either side thereof and the other a head mounted to rotate about a vertical axis which intersects the axis of the wheel and the tread thereof, the two said parts having vertical coengaging slides and guideways between them on both sides of the said wheel, springs between the two said carrier parts, a frame member in which the said carrier head is rotatably mounted about the axis aforesaid, means for imparting movements of rotation to the carrier about its axis for steering purposes, and means for imparting driving movements to the wheel.

6. In a motor vehicle, the combination with a combined driving and steering wheel, of a carrier therefor comprising two parts, one in the form of a yoke which straddles the wheel and has bearings therefor upon either side thereof, and the other a head mounted to rotate about a vertical axis which intersects the axis of the wheel and the tread thereof, the two said parts having vertical coengaging slides and guideways between them on both sides of the said wheel, springs between the two said carrier parts, a turret in which the said carrier head is rotatably mounted about the axis, the said turret and head having coengaging hubs constituting a radial bearing and coengaging peripheral flanges constituting an end thrust or step bearing, means for imparting movements of rotation to the carrier about its axis for steering purposes, and means for imparting driving movements to the wheel.

7. In a motor vehicle, the combination with a combined driving and steering wheel, of a carrier therefor comprising two parts, one in the form of a yoke which straddles the wheel and has bearings therefor upon either side thereof and the other a head mounted to rotate about a vertical axis which intersects the axis of the wheel and the tread thereof, the two said parts having vertical coengaging slides and guideways between them on both sides of the said wheel, springs between the two said carrier parts, a frame member in which the said carrier head is rotatably mounted about the axis aforesaid, a motor mounted upon the said frame member, a gear wheel arranged concentrically with the vertical axis of the carrier head and driven by the said motor, a vertical shaft mounted upon the carrier, the axis thereof being parallel with the vertical axis of the carrier head, a gear wheel upon the said shaft in gear with the first said gear wheel, intermeshing gear wheels upon the said shaft and driving wheel, and means for imparting movements of rotation to the carrier about its axis for steering purposes.

8. In a motor vehicle, the combination with a pair of combined driving and steering wheels, of carriers therefor each comprising two parts, one in the form of a yoke which straddles the wheel and has bearings therefor upon either side thereof, and the other a head mounted to rotate about a vertical axis which intersects the axis of the wheel supported thereby, and the tread of the said wheel, the two said parts having vertical coengaging slides and guideways between them upon both sides of the said wheel, springs between the said carrier parts, a frame including two turrets in which the said carrier heads are mounted about the vertical axes aforesaid, peripheral gear teeth carried by the said carrier heads, an intermediate idler gear wheel in mesh with both sets of gear teeth, a manual steering member, a gear wheel carried thereby, in mesh with the said intermediate idler gear wheel, and means for imparting driving movements to the said driving wheels.

WALTER CHRISTIE.

Witnesses:
HENRY HEWLETT TREDWELL,
W. HOWARD HAYWOOD.